United States Patent [19]

Gauthier et al.

[11] 4,269,476
[45] May 26, 1981

[54] HELMET-MOUNTED DISPLAY SYSTEM

[75] Inventors: François H. Gauthier; Jean-Paul Lepeytre, both of Paris, France

[73] Assignee: Thomson-CSF, Paris, France

[21] Appl. No.: 90,921

[22] Filed: Nov. 5, 1979

[30] Foreign Application Priority Data

Nov. 7, 1978 [FR] France .................. 78 31439

[51] Int. Cl.³ .............................. G02B 27/14
[52] U.S. Cl. ................................... 350/174
[58] Field of Search ............... 350/174, 149, 152, 154, 350/155, 96.15, 96.24, 112, 106, 96.2, 302, 286, 287

[56] References Cited

U.S. PATENT DOCUMENTS

| | | | |
|---|---|---|---|
| 3,357,769 | 12/1967 | Thompson | 350/174 |
| 3,945,716 | 3/1976 | Kinder | 350/174 |

OTHER PUBLICATIONS

Yoder, A Beam Combining Eyepiece Configuration, Nov. 1970, SPIE Journal, vol. 9, No. 1, Oct.-Nov. 1970, pp. 5-9.

Primary Examiner—John K. Corbin
Assistant Examiner—B. W. de los Reyes
Attorney, Agent, or Firm—Cushman, Darby & Cushman

[57] ABSTRACT

A helmet-mounted system for display of complex video images projected to infinity with a miniature cathode-ray tube, an optical device for transferring the image from the tube to the focal surface of a spherical mirror, and a semi-reflecting plane mirror in the form of a thin film. The image projected to infinity by the spherical mirror which is utilized on the axis is reflected from the plane mirror while enabling the viewer to see his normal surroundings at the same time. The collimating unit is advantageously constituted by two juxtaposed and cemented prisms.

6 Claims, 11 Drawing Figures

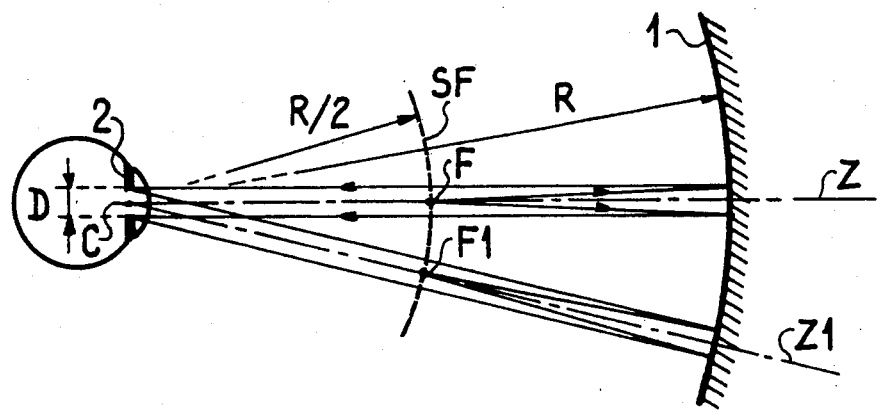
FIG_1
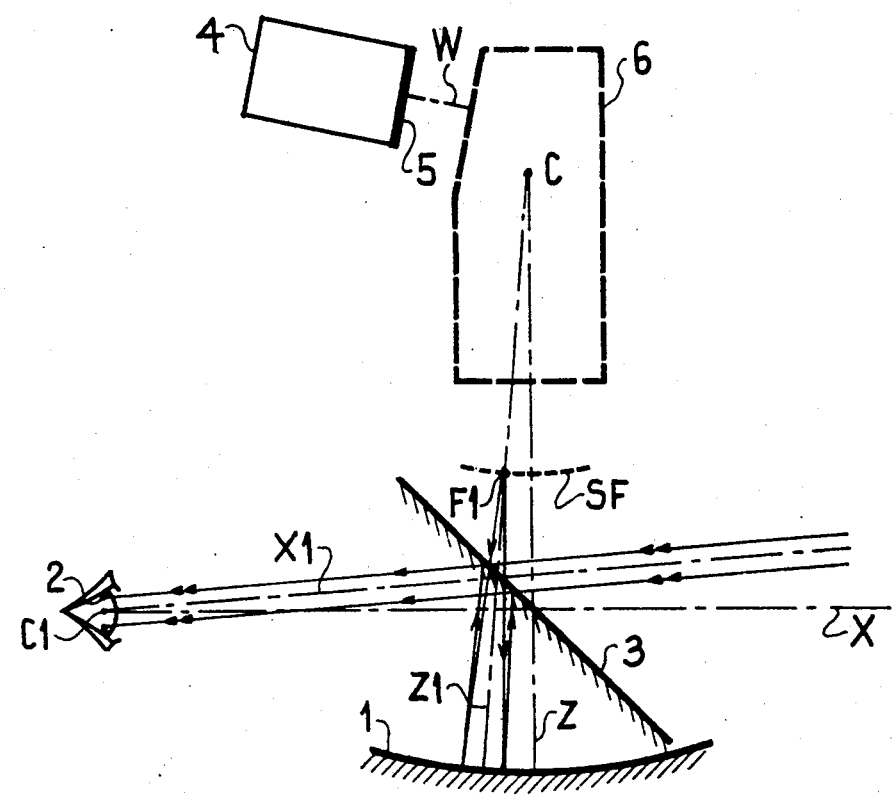
FIG_2

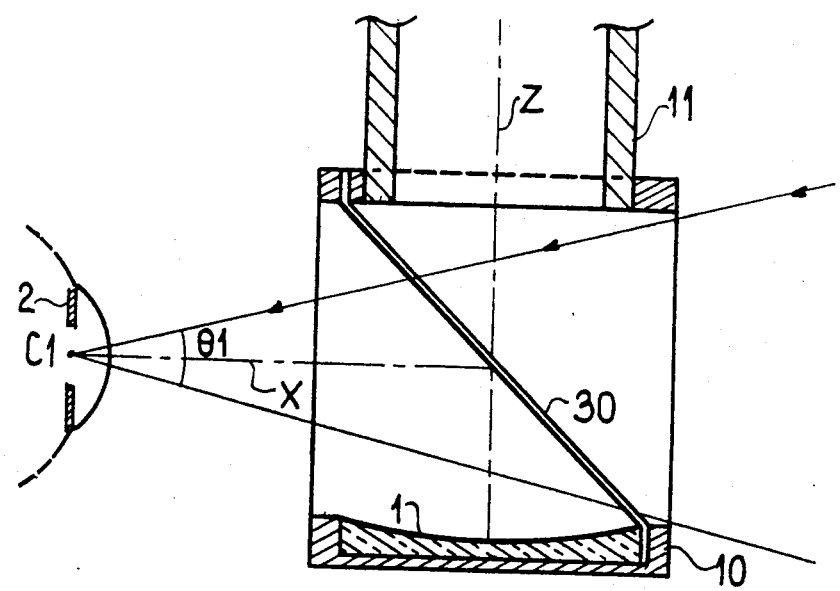
FIG_3
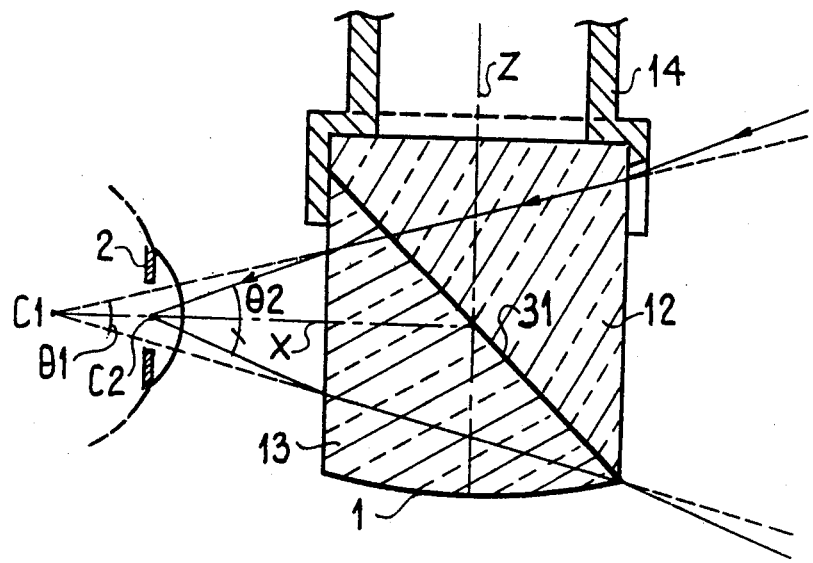
FIG_4

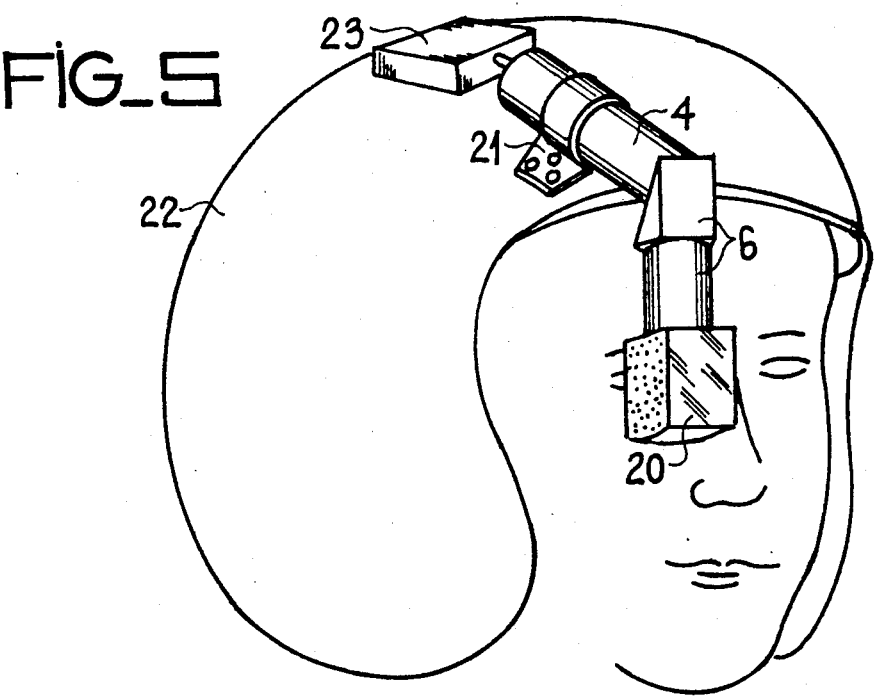
FIG_5
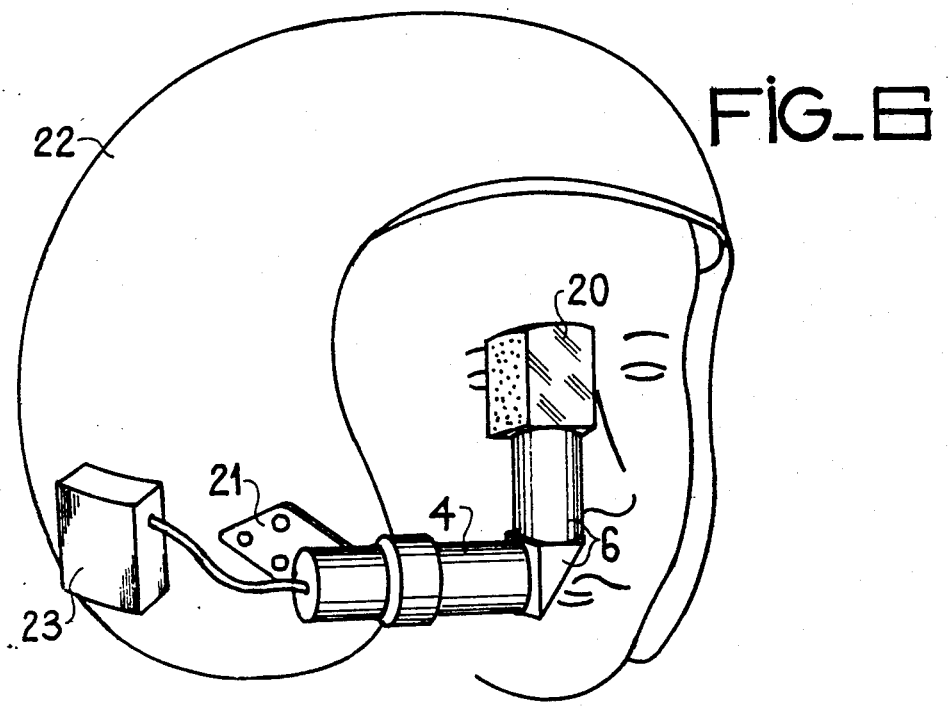
FIG_6

FIG_7
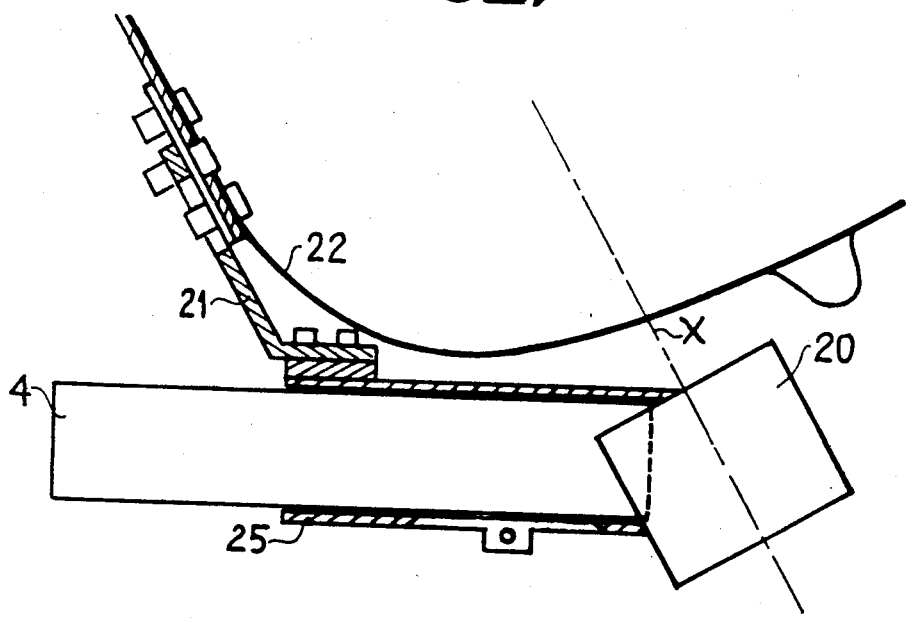
FIG_8
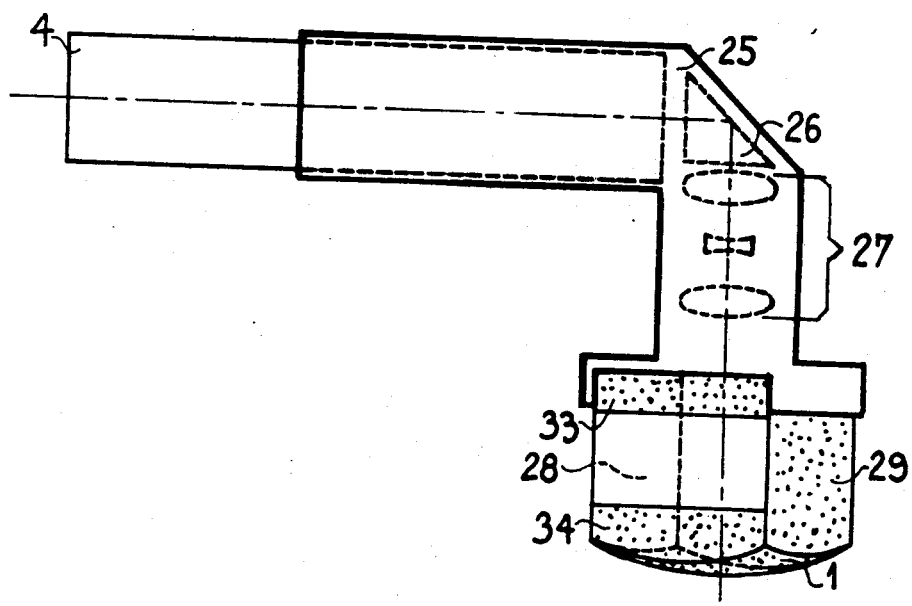

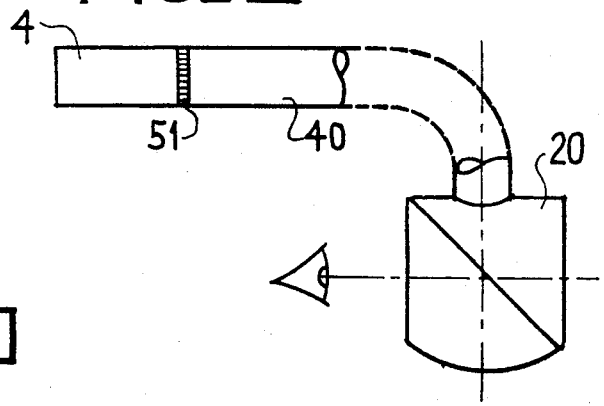
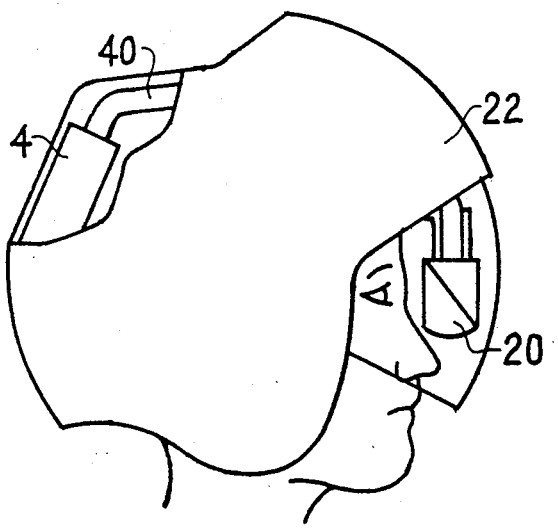
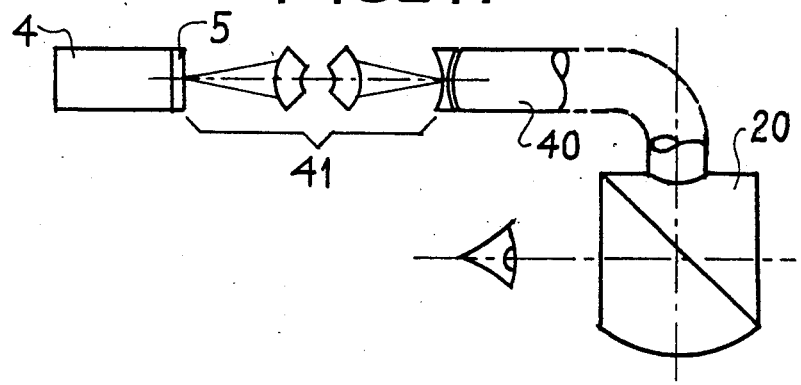

HELMET-MOUNTED DISPLAY SYSTEM

This invention relates to a helmet-mounted display system in which the image of a real luminous object can be viewed to infinity over a wide field angle and can be superimposed on the normal surroundings.

The apparent size of an object depends on its distance with respect to the viewer's eye. Wide fields of vision can consequently be produced by employing small-size optical systems which are located close to the eye. By securing the system to a helmet worn by the viewer, the visual information is continuously supplied independently of the movements of the viewer's head.

These considerations have led to the development of helmet-mounted collimating systems. The design concept and complexity of such systems are dependent on the application which is contemplated and especially on the useful field required for viewing the projected image.

Thus in avionics, in the field of optical tracking and target location, the useful field can be reduced from 6° to 10° since the object to be projected can consist of a single reticle. These systems, known as visors according to their intended function, can be put into effect simply by producing a reflection from a curved surface of the helmet visor which has been made semi-transparent. A spherical surface is suitable for small values of field. The paraboloid shape is utilized for fields of up to about 20° and permits visual display of a greater number of data.

Another field of application relates to the display of a complex imagery such as a synthetic video image of a piloting collimator or any other video image such as a television image, for example. The source which is best suited to form the object to be projected is a cathode-ray tube and the useful field angle must be at least 30° to 35°. The known optical solutions which provide the most satisfactory answer to this problem are the dioptric systems in which the optical combination can comprise:
optical deviation elements consisting of prisms or mirrors,
groups of lenses for image transfer and projection to infinity of the intermediate image,
and a semi-transparent plane mirror for combining a view of the projection with a view of the normal surroundings.

The complexity of dioptric systems increases very rapidly with the field, with the result that high-performance systems have a useful field angle which scarcely exceeds 40° in order to maintain characteristics of the projected image which are of sufficiently high quality and in order not to produce an undue increase in cost of the apparatus. The quality of the image is understood to mean the angular value of the light beam which emerges from a point source and passes into an eye of a viewer. In the case of a circular field of 40°, the quality of the image is little better than 1 mrd at the center of the field and 4 mrd at the edge of the field.

The display system proposed is directed to the sphere of application just mentioned, although this does not exclude the visor function. In accordance with a design which is relatively simplified in comparison with the dioptric systems, the display system under consideration makes it possible to obtain wide-field characteristics while maintaining a high quality of image and good integration on an operational helmet.

According to one distinctive feature of the invention, provision is made for a helmet-mounted display system comprising a unit for generating a luminous object to be displayed, an image transfer device for forming an intermediate image of the object on a focal surface of a collimating unit which projects said image to infinity, and a semi-transparent plane mirror inclined to the optical axis of the collimating unit for reflecting the projected image towards the viewer's eye and in order to provide a view of the environment at the same time. The invention is distinguished by the fact that the plane mirror is of practically zero thickness and placed between the image transfer device and a spherical mirror which forms the collimating unit. The intermediate image produced is spherical in order to conform to the focal surface of the spherical mirror, the viewer's eye being located substantially at the image point of the center of curvature of the spherical mirror as seen through the plane mirror.

The particular features and advantages of the invention will become apparent from the following description which is given by way of example with reference to the accompanying drawings in which:

FIG. 1 is a diagram which serves to recall the properties of a spherical mirror which is utilized on the axis;

FIG. 2 is a general diagram of a visual display system according to the invention;

FIG. 3 shows one example of construction of the optical collimating portion in which use is made of a semi-transparent plate;

FIG. 4 shows a preferred embodiment of the optical collimating portion in which use is made of prisms joined together;

FIGS. 5, 6, 7 and 8 are diagrams of construction of the system which is shown in FIGS. 2 and 4 and makes use of an image-transfer optical device;

FIGS. 9, 10 and 11 are diagrams of construction of the system which is shown in FIGS. 2 and 4 and makes use of an optical fiber connection for image transfer.

FIG. 1 recalls the properties of the spherical mirror 1 which is utilized on the axis, that is, with a pupil forming a diaphragm located at the center of curvature C and preferably in a plane at right angles to the axis Z on which the mirror is centered. In contrast, the condition of utilization is designated as "off-axis" when the pupil is placed at a distance from the center of curvature. Since the spherical mirror is not strictly stigmatic in the case of a focus F, F1, . . . and the point at infinity on the corresponding axis Z, Z1, . . . , it exhibits spherical aberration. Any radius can be considered as the principal axis if the pupil remains in the same relative position with respect to said radius, that is, when said pupil is positioned at the center of curvature. In this case, irrespective of the field angle, the beam or pencil of rays which passes through a pupil of small size such as a circular pupil of diameter D exhibits spherical aberration alone if the field curvature is excluded. This latter is in any case well known since the focal surface SF is located on a sphere having a radius R/2 which is one-half the radius R of the mirror and centered at C.

In any optical system designed for visual observation, the pupil of the observer's eye constitutes the effective pupil of the complete system which is considered to include the eye. Thus in the case of utilization of the spherical mirror shown in FIG. 1, the eye must therefore be placed at the center of curvature C. Since the light received by the pupil is reflected from the mirror substantially in the direction of incidence, an optical separator such as a partly reflective and partly transparent plane mirror is employed for separating the optical path of the incident radiation from that of the reflected radiation. Furthermore, the semi-transparent mirror enables the viewer to observe his normal surroundings at the same time. This configuration is shown in FIG. 2 which is a general diagram of the system.

The semi-transparent mirror 3 is positioned in such a manner as to ensure that the light rays reach the eye 2 after passage through the plane mirror 3, reflection from the spherical mirror 1 and reflection from the plane mirror 3 towards the viewer's eye, his eye being positioned at the point C1 which is the image of the center of curvature C through the mirror 3. The light radiation is represented in the case of an object point F1 on the focal surface SF. After passing through the plane mirror 3, the image of said point is projected back to infinity from the spherical mirror 1 in the form of parallel rays which are reflected from the plane mirror 3 towards the eye 2 in the direction X1. The light radiation from the viewer's normal surroundings in this direction X1 to the pupil of his eye is indicated by double arrows and passes through the mirror 3 which is also designated as a combining glass. In a preferential configuration, the glass is inclined at 45° to the principal axis Z of the spherical mirror 1; the axis X is perpendicular to the axis Z, passes through the image point C1, and represents the viewer's normal sighting axis.

The other elements of the combination comprise means 4 for generating the luminous object 5, the image of this latter being preferably formed on the screen of a miniature cathode-ray tube, and optical means 6 for producing an intermediate image of the object 5 on the focal surface SF. The optical device 6 is made necessary by reason of the fact that, in the design concept of a helmet visor, the object 5 cannot be positioned directly on the surface SF or conform to the curvature of this latter and also by reason of the fact that the optical axis W at the exit of the generator 4 is not usually oriented in the direction Z. In consequence, the optical device 6 comprises optical deviation elements of the mirror or prism type and utilizes a dioptric formula for producing image transfer to the focal surface SF.

The group consisting of spherical mirror 1 and semi-transparent plane mirror 3 will be designated hereinafter as a collimating unit. Since the system is carried by a helmet, the viewer's eye is located at a short distance from the collimating unit, namely a distance of a few centimeters. This gives rise to difficulties in designing the plane mirror 3 in the form of a plate having parallel faces by reason of the astigmatism produced by the fact that the plate is not orthogonal to the principal direction Z and that it has a certain thickness. The defect of astigmatism increases rapidly with the thickness of the plate and the angle of incidence of the rays which come from the intermediate image and are subsequently refracted within the plate for traversal in the direction of the spherical mirror 1. This solution therefore makes it necessary to seek a compromise by providing a very thin plate which comes as close as possible to the theoretical concept of a plate of practically zero thickness in order to reduce the astigmatism to a threshold which is tolerable for viewing.

FIG. 3 illustrates a form of construction of this type. The plate of extremely small thickness can attain about ten microns and is obtained by applying tension to a transparent plastic film 30 which is treated on one face so as to produce partial reflection. The film is stretched over a mounting frame 10 which holds it in position at opposite ends. The mounting frame is also designed to support the spherical mirror 1 and to be coupled to the structure 11 of the image-transfer optical device 6.

FIG. 4 illustrates a preferred form of construction of the collimating unit utilizing two prisms 12 and 13 joined side by side. The flat cementing surface 31 of the two prisms is so arranged as to constitute a semi-transparent plane mirror equivalent to a plate of extreme thinness. The bottom face of the prism 13 is spherical and made reflecting in order to form the spherical mirror 1. The set of prisms is formed of transparent optical material, namely either glass or plastic, and is supported by a structure 14 which provides a connection with the image-transfer portion. The viewer's eye 2 is placed at the image of the center of curvature of the mirror 1 through the plane mirror 31 while taking into account the optical path through media having different indices, namely air and the transparent material employed for the prisms. In consequence, the image point C1 is shifted to C2 and moved nearer to the collimating unit, thus producing an increase in the angular value of the field designated respectively by the references $\theta 1$ and $\theta 2$ in FIGS. 3 and 4. This value rises as the refractive index of the prism material is higher.

On the other hand, an increase in refractive index takes place at the expense of a number of parameters:
the distance from eye to collimator decreases and both viewing comfort and safety are reduced,
the material can be of plastic in the case of an index in the vicinity of 1.5 but must be of glass above this value, thus resulting in less convenient mass production and producing an increase in weight,
the exit pupil defined by the dimension of the zone in which the pupil of the viewer's eye is capable of moving while seeing the total field is reduced in diameter and viewing comfort is consequently impaired.

The quality of the image, however, is substantially maintained. By means of an optical system fabricated from plastic, a rectangular field of 30° to 35° in elevation and 40° to 45° in azimuth can readily be obtained. With glasses of higher refractive index, the field in elevation can attain 45° which is made to correspond to a field in azimuth of the order of 55°.

The means for generating the object to be displayed, or imagery source, can be of different types, namely illuminated reticles, liquid crystals, a matrix of electroluminescent diodes or a cathode-ray tube. This latter permits the widest variety of display with several light levels and is considered as a source in the following description. The luminous object 5 has the same dimensions as the screen of the cathode-ray tube 4 (FIG. 1) and mounting on the helmet entails the need for image transfer between the cathode-ray tube and the collimating unit. The optical transfer and deviation device 6 can be resolved in different ways from a cathode-ray tube by employing a dioptric and/or an optical-fiber formula which takes into account the correction of field curvature of the spherical mirror.

FIGS. 5 to 8 relate to the use of a dioptric formula representing a preferred solution from the standpoint of optical performances, especially the quality of the image which attains 0.5 mrd at the center of the field and 1.5 mrd at the edges. The system can be mounted on top of the helmet as shown in FIG. 5 or in accordance with the lateral arrangement shown in FIG. 6. The main elements illustrated in these figures are the tube 4, the prism collimator 20, the image-transfer device 6, a device 21 for mounting the optical system on the helmet 22, and a very-high-voltage supply 23 for the miniature cathode-ray tube.

FIGS. 7 and 8 show in greater detail one example of construction according to FIG. 6. As shown in FIG. 7, means 21 are provided for mounting the system on the helmet in an arrangement which makes it possible to adjust the position of the collimating unit 20 with respect to the viewer's eye in a direction parallel to the sighting axis X. The tube 4 and the image-transfer device 6 are maintained within a tubular and elbowed structure 25 which terminates in the form of a bracket at the end which is intended to support the collimating unit 20; this structure is rigidly fixed to the means 21 for attaching the optical system to the helmet. The image-transfer device 6 is constituted by a deviation prism 26 and a set of refracting lenses 27. The lateral faces 28 and 29 of the collimating unit 20 are not useful for optical transmission and are preferably roughened and blackened in order to eliminate parasitic reflections of rays which come from the exterior. With the same objective, the face opposite to the viewer's eye can be treated in the same manner in zones 33–34 which are located outside the field. The spherical face 1 is given a reflective treatment; the optical faces of the lenses and the useful faces of the unit 20 are given an anti-reflective treatment in the spectral band which is contemplated for utilization of the system.

FIG. 9 illustrates the case of image transfer by means of a bundle of optical fibers. The source is a cathode-ray tube 4, the front face of which is constituted by a thick disc 51 of optical fibers. The connection between the disc and the fiber bundle 40 can be made by bonding with a transparent adhesive. The other end of the bundle can be machined and polished so as to form a spherical surface having a radius R/2 and can be bonded by adhesive within a corresponding cavity formed on the top face of the collimating unit 20. A corresponding system for mounting on a helmet is illustrated in FIG. 10. This lightweight and compact design is well integrated with a helmet but provides a limited field in elevation since the intermediate image is material and visible to the observer. In addition, the system exhibits chromatic defects. In the case of a conventional cathode-ray tube having a front face 5 constituted by a plane glass surface, an optical lens system 41 (shown in FIG. 11) is employed in order to form the image of the object 5 on the front face of the optical fiber conductor 40. In order to avoid the difficulties involved in machining that end of the fiber bundle which is coupled to the collimator, one may opt for a hybrid solution and interpose a refracting lens, in which case the image is no longer material in the focal zone, the field can be wider and correction can be made for chromatic aberration.

It is thus apparent that many alternative forms are possible including the examples shown in FIGS. 5 to 11. It may be noted in particular that these examples can be adapted to the use of a collimating unit of the thin-plate type shown in FIG. 3.

The single-piece version of the collimating unit shown in FIG. 4 can be produced with more than two elements; in the case of systems made of glass, for example, the bottom curved surface which constitutes the spherical mirror and possibly also a top curved surface (which is the case shown in FIGS. 9 to 11) can be produced by means of elements joined to prisms having plane surfaces, for example by bonding a piano-convex meniscus lens to the bottom portion in order to form the mirror 1.

What is claimed is:

1. A helmet-mounted display system comprising a structure rigidly fixed to the helmet and the following components mounted on said structure:
   a unit for generating a luminous object to be displayed;
   an image transfer device comprising lenses for forming an intermediate image of spherical shape;
   a spherical mirror for projecting to infinity the intermediate image formed by said lenses on its focal surface;
   a semi-transparent plane mirror having a negligible thickness and placed between the image transfer device and the spherical mirror in order to reflect said projected image to a viewer's eye positioned at the center of curvature of said spherical mirror while at the same time making it possible to view normal surroundings through the plane mirror, the said spherical and semi-transparent plane mirrors being constituted by juxtaposed optical elements comprising at least two prisms in order to form a one-piece collimating unit, the lateral faces of the said one-piece collimating unit as well as zones forming part of the face opposite to the viewer's eye and located outside the field being rendered opaque in order to eliminate parasitic radiations.

2. A system according to claim 1, wherein the image transfer device comprises further an optical deviator for reflecting the said luminous object which is provided by a miniature cathode-ray tube and wherein the field of view attains 45° in elevation and 55° in azimuth and the quality of the image is within the range of 0.5 mrd at the center to 1.5 mrd at the edges of the field.

3. A helmet-mounted display system comprising a structure rigidly fixed to the helmet and the following components mounted on said structure:
   a unit for generating a luminous object to be displayed;
   an image transfer device comprising an optical fiber conductor for forming an intermediate image of spherical shape;
   a spherical mirror for projecting to infinity the intermediate image formed on its focal surface;
   a semi-transparent plane mirror having a negligible thickness and placed between the image transfer device and the spherical mirror in order to reflect said projected image to a viewer's eye positioned at the center of curvature of said spherical mirror while at the same time making it possible to view normal surroundings through the plane mirror, the said spherical and plane mirrors being constituted by juxtaposed optical elements comprising at least two prisms in order to form a one-piece collimating unit, the said one-piece collimating unit being machined in the location of the focal surface of the spherical mirror in the form of a cavity for receiving one end of the optical-fiber conductor which is machined in a complementary manner.

4. A system according to claim 3, wherein the luminous object generator is a miniature cathode-ray tube having a front face constituted by a thick disc of optical fibers which is optically coupled with the other end of the optical-fiber conductor.

5. A system according to claim 3, wherein the image transfer device comprises further lenses for optically coupling the other end of the optical-fiber conductor to the said luminous object generator.

6. A system according to claim 5, wherein the lenses optically couple said other end of the optical-fiber conductor to the flat front face of a conventional miniature cathode-ray tube which constitute the luminous object generator.

* * * * *